United States Patent
Horchler et al.

(10) Patent No.: US 7,249,640 B2
(45) Date of Patent: Jul. 31, 2007

(54) HIGHLY MOBILE ROBOTS THAT RUN AND JUMP

(76) Inventors: Andrew D. Horchler, 2300 Overlook Rd., Apt. 414, Cleveland, OH (US) 44016; Roger D. Quinn, 2353 Ira Rd., Akron, OH (US) 44333; Bram Lambrecht, 2660 Derbyshire Rd., Cleveland Heights, OH (US) 44106; Jeremy M. Morrey, 108 W. Gyena Pl., #302, Denver, CO (US) 80223

( * ) Notice: Subject to any disclaimer, the term of this patent is extended or adjusted under 35 U.S.C. 154(b) by 418 days.

(21) Appl. No.: 10/845,583

(22) Filed: May 13, 2004

(65) Prior Publication Data

US 2005/0133280 A1    Jun. 23, 2005

Related U.S. Application Data

(63) Continuation-in-part of application No. 10/161,530, filed on Jun. 3, 2002, now Pat. No. 6,964,309.

(60) Provisional application No. 60/469,991, filed on May 13, 2003, provisional application No. 60/295,778, filed on Jun. 4, 2001.

(51) Int. Cl.
    *B62D 57/02*    (2006.01)
(52) U.S. Cl. .................. 180/8.6; 180/8.1; 180/8.5; 180/7.1
(58) Field of Classification Search ............. 180/7.1, 180/8.1, 8.2, 8.5, 8.6, 8.7, 194, 195; 280/5.26, 280/5.28, DIG. 10; 464/51, 54, 57, 61.1, 464/66.1, 77; 305/1, 4, 5; 446/308, 330, 446/353, 356; 901/1, 45
See application file for complete search history.

(56) References Cited

U.S. PATENT DOCUMENTS 177,064 A    5/1876   Fowler (Continued)

OTHER PUBLICATIONS

Ritzmann, R.E., R.D. Quinn, J.T. Watson and S.N. Zill (Jan. 2000) "Insect walking and biorobotics: A relationship with mutual benefits," *Bioscience*, 50(1):23-33.

(Continued)

*Primary Examiner*—Lesley D. Morris
*Assistant Examiner*—Daniel Yeagley
(74) *Attorney, Agent, or Firm*—Renner, Otto, Boisselle & Sklar LLP

(57)    ABSTRACT

The present invention relates to novel, highly mobile small robots called "Mini-WHEGS™" that can run and jump. They are derived from our larger WHEGS™("wheel-like lecis") series of robots, which benefit from abstracted cockroach locomotion principles. Part of their success is derived from the three spoked appendages, called "WHEGS™", which combine the speed and simplicity of wheels with the climbing mobility of legs. To be more compact than the larger WHEGS™ vehicles, Mini-WHEGS™ uses four wheel-like legs in an alternating diagonal gait. These 9 cm long robots can run at sustained speeds of over 10 body lengths per second and climb obstacles that are taller than their leg length. They can run forward and backward, on either side. Their robust construction allows them to tumble down a flight of stairs with no damage and carry a payload equal to twice their weight. A jumping mechanism enables Mini-WHEGS™ to surmount much larger obstacles such as stair steps.

43 Claims, 4 Drawing Sheets

U.S. PATENT DOCUMENTS

| | | | |
|---|---|---|---|
| 1,144,373 A | | 6/1915 | Morton |
| 1,420,839 A | | 6/1922 | Henrie |
| 1,450,671 A | | 4/1923 | Lincoln |
| 1,465,261 A | | 8/1923 | Gerstmayr |
| 1,607,192 A | * | 11/1926 | Fischer ........................ 446/312 |
| 2,187,938 A | | 1/1940 | Eaid |
| 2,400,824 A | * | 5/1946 | Jackson ...................... 180/8.2 |
| 2,664,962 A | | 1/1954 | Faszczuk |
| 3,208,544 A | * | 9/1965 | Colvin ........................ 180/8.3 |
| 3,226,878 A | | 1/1966 | Glass |
| 3,241,848 A | * | 3/1966 | Flory ......................... 280/5.26 |
| 3,411,599 A | | 11/1968 | Kahlmorgan |
| 3,529,479 A | * | 9/1970 | Ryan et al. ................... 74/15.4 |
| 3,638,745 A | * | 2/1972 | Floyd ........................... 60/466 |
| 3,695,727 A | | 10/1972 | Sesky et al. |
| 4,200,161 A | * | 4/1980 | Penington, Jr. .............. 180/8.2 |
| 4,406,640 A | | 9/1983 | Franklin et al. |
| 4,502,556 A | | 3/1985 | Bartholet |
| 4,503,924 A | | 3/1985 | Bartholet |
| 4,687,213 A | * | 8/1987 | Ridderstolpe .............. 280/5.26 |
| 4,790,548 A | * | 12/1988 | Decelles et al. ........... 280/5.26 |
| 4,794,999 A | * | 1/1989 | Hester ........................ 180/8.2 |
| 4,960,179 A | | 10/1990 | Leach |
| 5,085,289 A | | 2/1992 | Chance |
| 5,121,805 A | | 6/1992 | Collie |
| 5,725,412 A | * | 3/1998 | Ishimoto ..................... 446/437 |
| 6,296,096 B1 | | 10/2001 | Chludek |
| 6,481,513 B2 | | 11/2002 | Buehler et al. |
| 6,939,197 B1 | * | 9/2005 | Hoeting ....................... 446/437 |
| 6,964,309 B2 | * | 11/2005 | Quinn et al. ................. 180/8.1 |
| 2001/0054518 A1 | | 12/2001 | Buehler et al. |

OTHER PUBLICATIONS

Alexander, R. McN. (Apr. 1990) "Three uses for springs in legged locomotion," *International Journal of Robotics Research*, 9(2):53-61.

U. Saranli, M. Buehler and D.E. Koditschek (Apr. 2000) "Design, Modeling and Preliminary Control of a Compliant Hexapod Robot," Proceedings 2000 IEEE International Conference on Robotics and Automation (ICRA'00), San Francisco, CA.

Quinn, R.D., G.M. Nelson, R.J. Bachmann, D.A. Kingsley, J. Offi, and R.E. Ritzmann (Sep. 2001) "Insect Designs for Improved Robot Mobility," Proceedings 4th International Conference on Climbing and Walking Robots (CLAWAR 2001), K.Berns and R.Dillman (eds.), Karlsruhe, Germany, pp. 69-76.

A. Martin-Alvarez, W. de Peuter, J. Hillebrand, P. Putz, A. Matthyssen, and J. F. de Weerd (May 1996) "Walking robots for planetary exploration missions," Proceeding Second World Automation Congress (WAC'96), Montpellier, France, pp. 7-14.

Espenshied, K.S., R.D. Quinn, H.J. Chiel and R.D. Beer (1993), "Leg Coordination Mechanisms in the Stick Insect Applied to Hexapod Robot Locomotion," *Adaptive Behavior*, 1(4):455-468.

Angle, C.M., and R.A. Brooks (Jul. 1990) "Small Planetary Rovers," Proceeding 1990 IEEE International Workshop on Intelligent Robots and Systems (IROS'90), pp. 383-388.

Maes, P. and R.A. Brooks (Aug. 1990) "Learning to Coordinate Behaviors," Proceedings 9th Annual National Conference on Artificial Intelligence / sponsored by American Association for Artificial Intelligence, Boston MA, pp. 796-802.

Brooks, R.A. (May 1989) "A Robot that Walks; Emergent Behavior from a Carefully Evolved Network," Proceedings 1989 IEEE International Conference on Robotics and Automation (ICRA'89), Scottsdale AZ, pp. 692-696.

H. Komsuoglu, R. Altendorfer, R. Full, U. Saranli, B. Brown, D. McMordie, E. Moore, M. Buehler, and D. Koditschek (Dec. 2000) "Evidence for Spring Loaded Inverted Pendulum Running in a Hexapod Robot," Experimental Robotics VII : Proceedings 2000 International Symposium on Experimental Robotics (ISER 2000), Honolulu, HI, pp. 291-302.

M. Buehler, U. Saranli, D. Papadopoulos and D.E. Koditschek (Aug. 2000) "Dynamic Locomotion with four and six-legged robots," Proceedings 1st International Symposium on Adaptive Motion of Animals and Machines (AMAM 2000), Montreal, Canada.

H. Komsuoglu, D. McMordie, U. Saranli, N. Moore, M. Buehler, D.E. Koditschek (May 2001) "Proprioception Based Behavioral Advances in Hexapod Robot," Proceedings of the IEEE International Conference on Robotics and Automation (ICRA'01), Seoul, Korea, pp. 3650-3655.

U. Saranli, M. Buehler, D.E. Koditschek (Jul. 2001) "RHex: A Simple and Highly Mobile Hexapod Robot," *International Journal of Robotics Research*, 20(7):616-631.

R. Altendorfer, N. Moore, H. Komsuoglu, M. Buehler, H.B. Brown Jr., D. McMordie, U. Saranli, R.J. Full, D.E. Koditschek (Nov. 2001) "RHex: A Biologically Inspired Hexapod Runner," *Autonomous Robots*, 11(3):207-213.

Espenshied, K.S., R.D. Quinn, R.D. Beer and H.J. Chiel (Jul. 1996) "Biologically based distributed control and local reflexes improve rough terrain locomotion in a hexapod robot," *Robotics and Autonomous Systems*, 18(1):59-64.

Publication Date Unknown U. Saranli, D.E. Koditschek "Design and Analysis of a Flipping Controller for RHex."

Publication Date Unknown U. Saranli, M.Buehler "Modeling and Analysis of a Spatial Compliant Hexapod."

\* cited by examiner

HIGHLY MOBILE ROBOTS THAT RUN AND JUMP

CLAIM OF PRIORITY

This patent is a Continuation-in-Part of U.S. Utility Application No. 10/161,530, filed on Jun. 3, 2002 now U.S. Pat. No. 6,964,309, and which claims priority to U.S. Provisional Application No. 60/295,778 filed on Jun. 4, 2001. This patent also claims priority to U.S. Provisional Application No. 60/469,991 filed on May 13, 2003. The foregoing priority references are each incorporated herein by reference in their entirety.

STATEMENT REGARDING FEDERALLY SPONSORED RESEARCH OR DEVELOPMENT

This invention was sponsored by DARPA under contract DAAN02-98-C-4027.

BACKGROUND OF THE INVENTION

Highly mobile small vehicles, sometimes called microrobots, are better suited for certain missions than larger vehicles. For example, they can aid in search and rescue because their diminutive size enables them to fit into tight spaces, such as those found in rubble and in caves. As another example, a group of small robots provide robustness through redundancy for remote missions such as extraterrestrial exploration. Mobile small robots also are appropriate for insect inspired research because their scale is similar to that of the insect models.

A variety of such relatively small robots have been developed, but the majority of them have limited mobility. For example, some use small wheels and can move only on very smooth, flat surfaces. Others use relatively large wheels as compared to the size of the robots for improved mobility, but they still suffer from the limitations of wheels on complex terrain. Still others use tracks but at a relatively small scale it is difficult to implement a modern track suspension.

It is difficult for small robots to move through real-world terrain because of the relative size of the obstacles they must overcome. Therefore, there is a need for efficient locomotory appendages for relatively small robots. For example, for a given vehicle size, legs may provide the greatest mobility because they enable discontinuous contact with the substrate, which is advantageous for travel on uneven terrain. Insects are excellent examples of highly mobile legged vehicles.

Some robots have their basis in insect mobility. For example, RHex disclosed a simple and highly mobile insect-based hexapod robot. Int. J. Robotics Research, 20(7): 616-631. WHEGS™ ("wheel-like legs") also disclosed insect-based robots in: Improved Mobility Through Abstracted Biological Principles, 2002 IEEE International Conference On Intelligent Robots and Systems, Lausanne, Switzerland. The disclosures of RHex and WHEGS™ robots are good examples of relatively large (e.g. on the order of about 50 cm long) hexapods that use abstracted cockroach locomotion principles to great effect. RHex uses six motors to independently rotate its legs. WHEGS™ robots, however, may use one propulsion motor and rely on preflexes to adapt their gaits to different terrain. Their driving appendages are sometimes called "WHEGS™" wheel-like legs, one example of which has three spokes and combines the speed and simplicity of wheels with the climbing mobility of legs. The "WHEGS™" equipped robots are several times faster, for example on the order of three (3) body lengths per second, than other legged robots of similar size and can climb obstacles that are relatively tall, e.g. on the order of about 1.5 leg lengths tall.

SUMMARY OF THE INVENTION

The present invention relates to relatively small robots, for example, less than 50 cm or in some instances less than about 10 cm in length. The robots may be highly mobile, robust, and power autonomous. Their basic design may embody some features from the WHEGS™ ("wheel-like legs") robot concept, but with modifications to reduce size and improve mobility. For example, in one embodiment a 9 cm long robot can run at sustained speeds of over 10 body lengths per second and climb obstacles higher than the length of its legs. Another embodiment may have a jump mechanism that enables it to surmount obstacles. Another embodiment has controllable running, jumping and steering functionality.

According to an embodiment of the present invention, a robot that is adapted to run and jump includes a robot chassis that supports system components including a drive train, steering components, power supply and onboard radio controlled components. The chassis has two axles, each with two multi-spoke driving appendages, and a single drive motor and transmission attached to the chassis to simultaneously power the two driving appendages on each axle to enable the running and jumping functions.

According to another embodiment of the invention, each of the driving appendages is driven via the same drive motor connected to the front and rear axles by a drive train, e.g., a non-slip drive train, one example of which includes two sets of chains and sprockets. Further, the motor is coupled to another transmission that outputs a slow, high torque motion and winds a spring-activated jumping mechanism.

According to another embodiment of the invention, each of the driving appendages is driven via the same drive motor connected to the front and rear axles and a second jump motor connected through a transmission outputs a slow, high torque motion and winds a spring-activated jumping mechanism.

According to another embodiment of the invention, each driving appendage has a foot in the general form of an arc segment that follows the circumference of the driving appendage.

According to another embodiment of the invention, each driving appendage has slender flexible spokes for providing torsional compliance and passive gait changes.

One or more of the above and other aspects, objects, features and advantages of the present invention are accomplished using the invention described and claimed below. Also it will be appreciated that a part or feature, etc. shown in one embodiment or drawing may be used in the same or a similar way in another embodiment.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed.

Although the invention is shown and described with respect to certain embodiments, it is obvious that equivalents and modifications will occur to others skilled in the art upon the reading and understanding of the specification. The present invention includes all such equivalents and modifications, and is limited only by the scope of the claims.

DESCRIPTION

Figure 1:
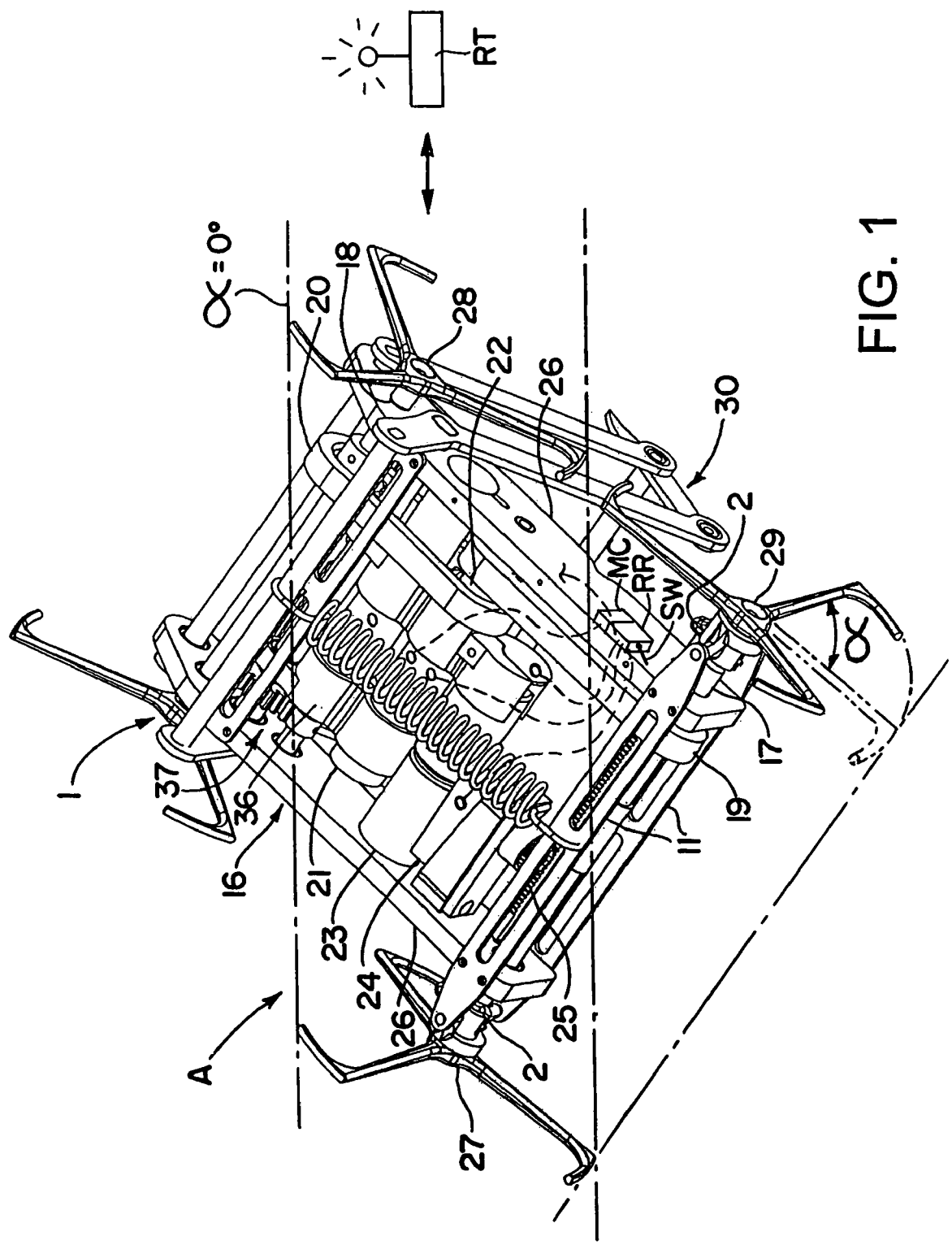
FIG. 1 is a schematic isometric view of a robot according to an embodiment of the invention illustrating the features of diagonal gait, running mobility and steering with controllable jumping.

Referring to the drawings, in FIG. 1 a robot A embodying features of the invention is illustrated. The drawings, which are not necessarily to scale, generally illustrate features of the invention, in some instances schematically, The robot A which is described in greater detail below, is relatively compact and durable. The robot A has several axles and driving appendages. A drive train and propulsion motor provide motive effort to propel the robot, e.g., by providing motive force to one or more axles to move the driving appendages. A steering mechanism may be included. Power may be provided the robot A by an onboard power supply, e.g. one or more batteries, or by another electrical connection to a remote power source. Various control mechanisms for operation of the robot A control mechanisms may be provided, such as, for example, an adjustable control, a mechanical control, a radio control, autonomous control, etc.; and these may be wholly or partly onboard the robot. One or more of the aforementioned parts of the robot A may be mounted on, housed in, or otherwise supported by a chassis of the robot. The chassis may be of rectangular shape or of some other shape.

The robot A may include a jumping mechanism. As the robot runs, the jumping mechanism may slowly retract, release to cause the robot to jump, and then repeat. One embodiment uses the same single drive motor to simultaneously power both the running and jumping functions. An additional gear reduction may be used to provide sufficient torque to wind a spring of a jumping mechanism. In another embodiment, a separate jump motor may be used to control and power the jumping function.

Legs

Three-spoke driving appendages may be used to propel the robots. The spokes of each driving appendage can be spaced 120 degrees apart and two driving appendages can be mounted on each axle. Contralateral pairs of driving appendages can be nominally positioned 60 degrees out of phase with each other. Robots according to the invention can have three axles, each 60 degrees out of phase with its neighbor; one motor may drive all three axles via a drive train, e.g., chains and sprockets, so that the robot walks in a cockroach-like nominal alternating tripod gait. In other embodiments the robot may have two axles or more than three axles.

The robots may have compliant mechanisms in their axles and/or their driving appendages that enable the driving appendages to passively change their phase, for example in one embodiment by as much as 60 degrees or more. The result is that their gaits passively adapt to the terrain, and they climb with contralateral legs in phase, in a manner similar to the climbing movements of a cockroach. This enables them to simultaneously apply force by two legs to surmount an obstacle with no active control intervention.

Figure 3:
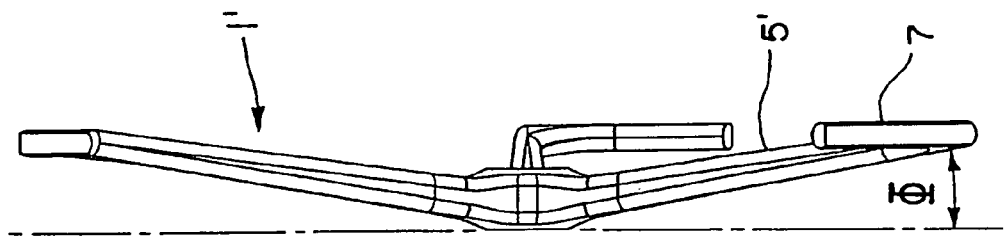
FIG. 3 is a side view illustrating a driving appendage with splayed spokes.
Figure 2:
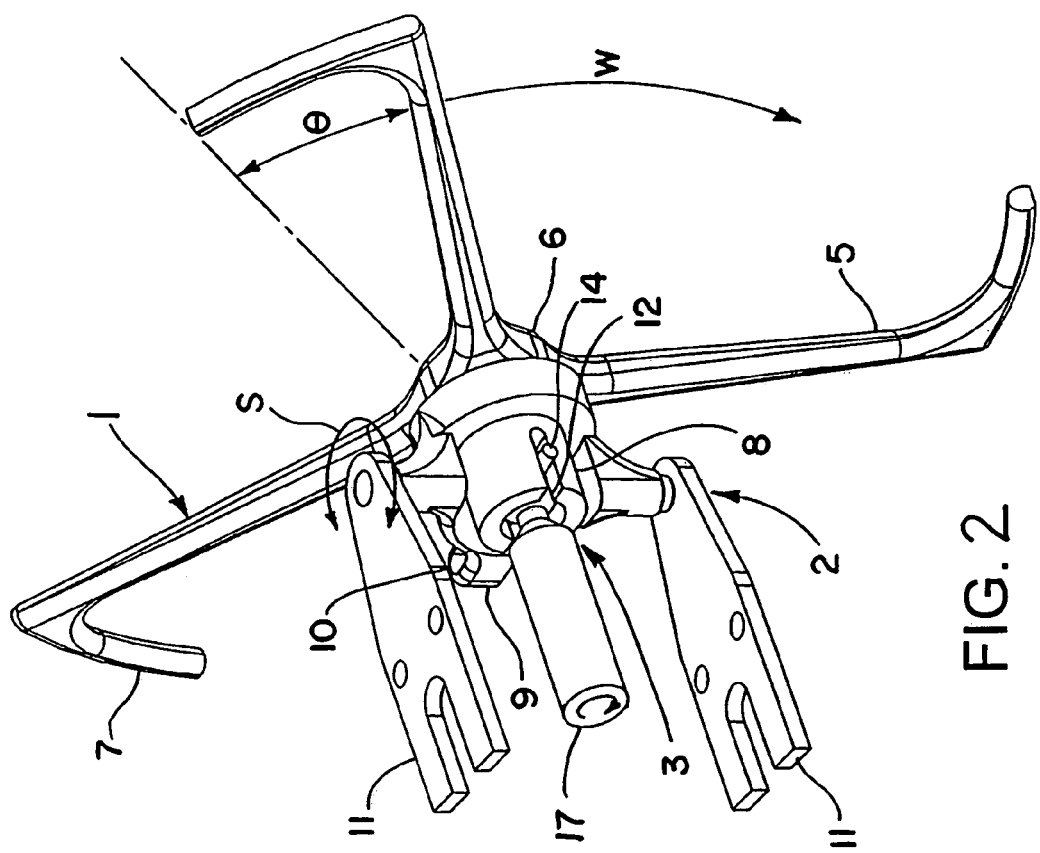
FIG. 2 is a schematic isometric view illustrating a front driving appendage and steering joint of robot, such as the robot of FIG. 1.

FIGS. 1-3 illustrate an example of a driving appendage used in robot A. FIG. 2, for example, shows a driving appendage 1 with an associated steering assembly 2 and a universal joint assembly 3. The driving appendage 1 includes a plurality of spokes 5 extending outwardly from a center hub 6 and each spoke terminates with a foot 7 designed such that it extends a selected arc segment of $\theta$ (theta) degrees along an hypothetical circumference of the driving appendage 1.

The robot A of the present invention typically uses only four driving appendages. In one robot embodiment, the driving appendages 1 are each machined from a single piece of polymer material. This design allows for a certain amount of compliance under normal operation due to the flexible polymer material and slender spokes. Other robots may use rigid driving appendages coupled to the axle through a flexible coupling system, similar in concept to that disclosed in the above '530 patent application.

In another embodiment of the robot, the driving appendages have a sharp tipped foot, which may penetrate carpet and other yielding surfaces to provide good traction. However, this foot sometimes snagged on the substrate and caused the vehicle to somersault into the air. Tending to avoid such snagging, the driving appendages or the spoke thereof may have a foot 7 that has an arc segment of $\theta$ (theta) degrees in length that generally follows the circumference of the driving appendages. Theoretically, the length of each foot of a three-spoke driving appendage could be increased from 0 to 120 degrees—in other words, from bare spokes to nearly a complete wheel. However, as the length of the foot 7 is increased, the climbing ability of the robot is diminished. At the limit, a larger foot would provide the speed and smooth ride of a wheel, but also with the climbing performance of a wheel. In one example, A relatively short segment length of about 25 degrees provides enough surface area to prevent snagging on softer surfaces without sacrificing significant climbing ability.

The angle of the spokes 5 can be adapted for the application. For example, while the spokes of one axle's driving appendages may occupy a purely vertical plane, the other axle's driving appendage spokes 5' may be splayed outward at an angle $\Phi$ (phi) degrees so that they rotate in a cone, see FIG. 3. This design allows, for example, greater clearance of the frame of the robot for a tighter turning radius. Additionally, a slight splay aids in the lateral stability of the robot by widening its stance.

Steering

The steering mechanism for the robot A can be similar to the system in an automobile as shown in FIGS. 1 and 2. Each front driving appendage 1 rotates in a bearing 8, which is supported by a steering arm 9. A servo actuated sliding rack connects to the steering arms 9 with a slot 10 and pin. The steering arms 9 pivot in mountings on chassis cross braces 11 to provide a steering movement S.

All four driving appendages may be driven, and in that case the front axle must transmit power to the driving appendages and still allow for steering movement. If desired, relatively flexible materials may be used in the drive trains and/or steering mechanisms of the robot A. If desired, one or more components between the axle(s) and the feet that engage the substrate, e.g. ground, floor, carpet, etc., can provide torsional compliance for automatic gait adaptation. For example, some robot embodiments have axle-based torsional compliance as shown in the '530 patent application. Other robots forgo axle-based torsional compliance for greater precision and strength, and instead, such robots rely solely on driving appendage flexibility for torsional compliance and passive gait adaptation.

To provide a strong and reliable steering system for one robot embodiment, a simplified universal joint 3 for each front driving appendage uses no flexible components, see FIG. 2. The universal joint consists of a ball 12 at either end of the front axle 17 inserted into a brass cup, which is mounted in the steering arm bearing 8. A pin 14 attached to the ball 12 slides in a slot in the brass cup to transfer torque while allowing the cup to pivot around the ball 12. Dimensions of steering arms and other components may be optimized to allow the maximum pivoting travel given certain clearance and servo travel limitations.

Chassis and Drive Train

FIG. 1 illustrates one embodiment of a robot A complete with steering and jumping abilities. The robot A includes a chassis 16 in which is mounted a front axle 17 and a rear axle 18. The axles are driven respectively by front drive chain 19 and rear drive chain 20. The drive chains receive their power from drive motor and transmission 21 through drive sprockets 22, both mounted in or on chassis 16 or otherwise supported by the chassis.

Also mounted with respect to chassis 16 are the batteries 23 and the steering servo 24 which drives the steering assemblies 2 via steering rack 25.

The chassis 16 is a simple rectangular structure formed by side rails 26 and several cross braces 11. The chassis and other structural components may by made of aluminum, stainless steel, plastic, or other suitable material. The shape of the chassis may be other than rectangular, e.g. oval, hexagonal, pentagonal, or some other shape.

In an exemplary embodiment, the rectangular frame of a robot contains a single D.C. drive motor, e.g., 1.2W Maxon DC drive motor, with a transmission, e.g., a 67:1 planetary transmission, drive train, steering components, batteries and control system. The frame itself may include two polymer side rails with aluminum cross-braces on the top and bottom. The side rails may be precisely machined to support nearly every component inside the robot, including axle bearings, motor mounts, battery supports, and the steering servo and rack. The physical dimensions of such a robot embodiment's chassis, for example, may be 9.0 cm long by 6.8 cm wide by 2.0 cm thick with attached 3.6 cm radius driving appendages. The robot's mass, for example, may be 146 g, including batteries.

The robot A may have two axles connected to one drive motor via non-slipping drive train, one example of which uses stainless steel drive chains. A non-slipping drive connection is used to maintain the correct phase offset between front and rear axles in order to achieve a nominal alternating diagonal gait. The use of one motor and a non-slip drive train, e.g., a chain drive, to propel the robot has the additional advantage that all of the onboard power can be delivered to a single WHEGS™ ("wheel-like leg") when the others are slipping on the substrate. Other non-slip drive trains to provide power from a motor to one or more axles of the robot A also or alternatively may be used.

Power and Operation

In one embodiment, control of a robot is accomplished via a four-channel radio control (RT) transmitter and a sub-micro four-channel receiver (RR). A separate micro-speed controller (MC) can be employed for bi-directional throttle control. A micro-servo 24 can be used to actuate the steering motion. Connections for the receiver RR and controller MC are shown schematically in dash lines. An electrical switch (SW) may be operated to provide power to the robot A.

An exemplary robot A may use two 3V CR2 lithium batteries 23 connected in series for its power needs. These battery cells were chosen because of their high power density relative to their size and weight, for their flat power curves, and for their capacity to deliver very high current on demand. Other power sources may be used.

The robot A is easy to operate. A small switch SW turns on the robot and the radio control transmitter RT can be used to control steering and throttle, and if desired, jumping. The robot may operate without use of a radio control. For example, turning on the switch SW may provide power to the motor(s) and the robot may travel and, if it includes a jumping feature, may jump from time to time. If a speed control MC is used, speed may be manually set. If no speed control is used, the robot A may operate at a speed determined by the motor, batteries, and any appropriate gearing, etc. Jumping may occur without a selective setting of a control. Steering may be controlled by the radio controller mechanism or may be manually set; or steering may be fixed such that adjustment or control is not possible.

In an exemplary jumping embodiment of the robot, control and actuation of jumping are accomplished mechanically via a slip-gear mechanism. The robot may be simply turned on with a switch and then automatically runs, jumps, and repeats until it is turned off.

Diagonal Gait

As noted above, three-spoke driving appendages for robot A may be used to propel the robots. The spokes of each driving appendage are spaced 120 degrees apart and two driving appendages are mounted on each axle. Contralateral pairs of driving appendages are nominally positioned 60 degrees out of phase with each other. In a robot that has three axles, each may be 60 degrees out of phase with its neighbor. One motor may drive all three axles via chains and sprockets, for example, so that robot walks in a cockroach-like nominal alternating tripod gait.

Figure 6:
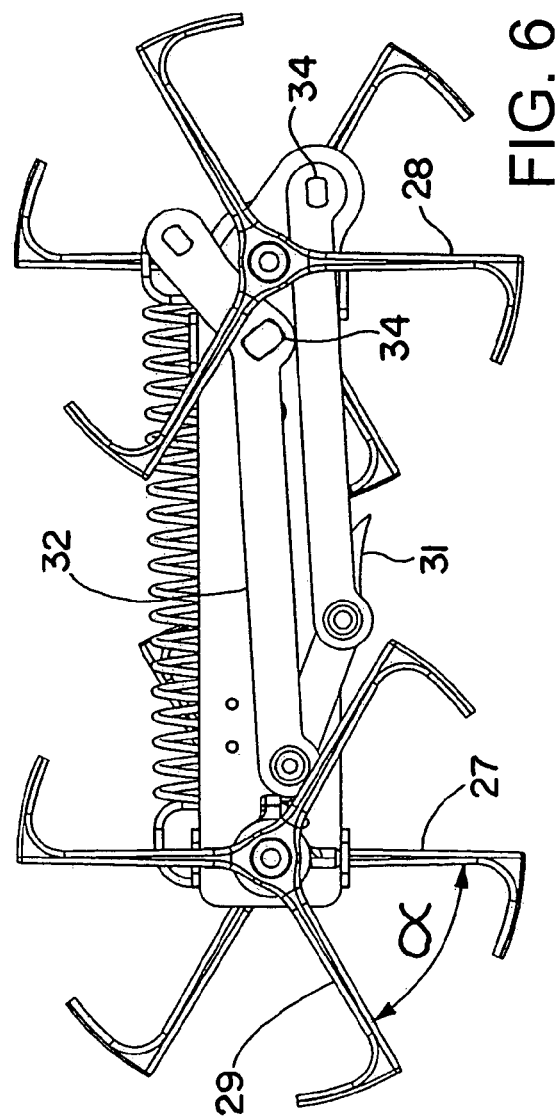

FIGS. 1 and 6 illustrate the diagonal gait feature of the robot A that has two axles 17 and 18 connected to one drive motor and transmission 21 via non-slipping drive train, e.g., drive chains 19 and 20. This non-slipping drive connection provides the correct phase offset, a (alpha) degrees, between front and rear axles to achieve a nominal alternating diagonal gait. As shown in FIGS. 1 and 6, front left driving appendage 27 is identically in phase with its diagonal counterpart rear right driving appendage 28 and is out of phase by offset α (alpha) degrees with its contralateral partner driving appendage 29. The non-slipping drive train usually avoids the need for active control of the relative phase of the diving appendages. Several examples of a non-slipping drive train include a chain, e.g. stainless steel or other material chain, a timing belt, or other systems. Without a non-slipping drive train, active controls may be needed for providing nominal desired phase relation of the driving appendages Jumping Mechanism The robot A embodiment shown in FIGS. 1 and 4 includes the functionality for fully controllable running, jumping, and steering.

The parallel four-bar jumping mechanism 30, as shown in FIGS. 1, 4, 6 and 7 has several advantages. First, the prescribed motion of the spiked lower bar 31, or "foot," propels the robot forward and upward, a desirable trajectory for obstacle clearance. Second, it is able to fold to a compact position between jumps, allowing the robot A to run swiftly.

Figure 4:
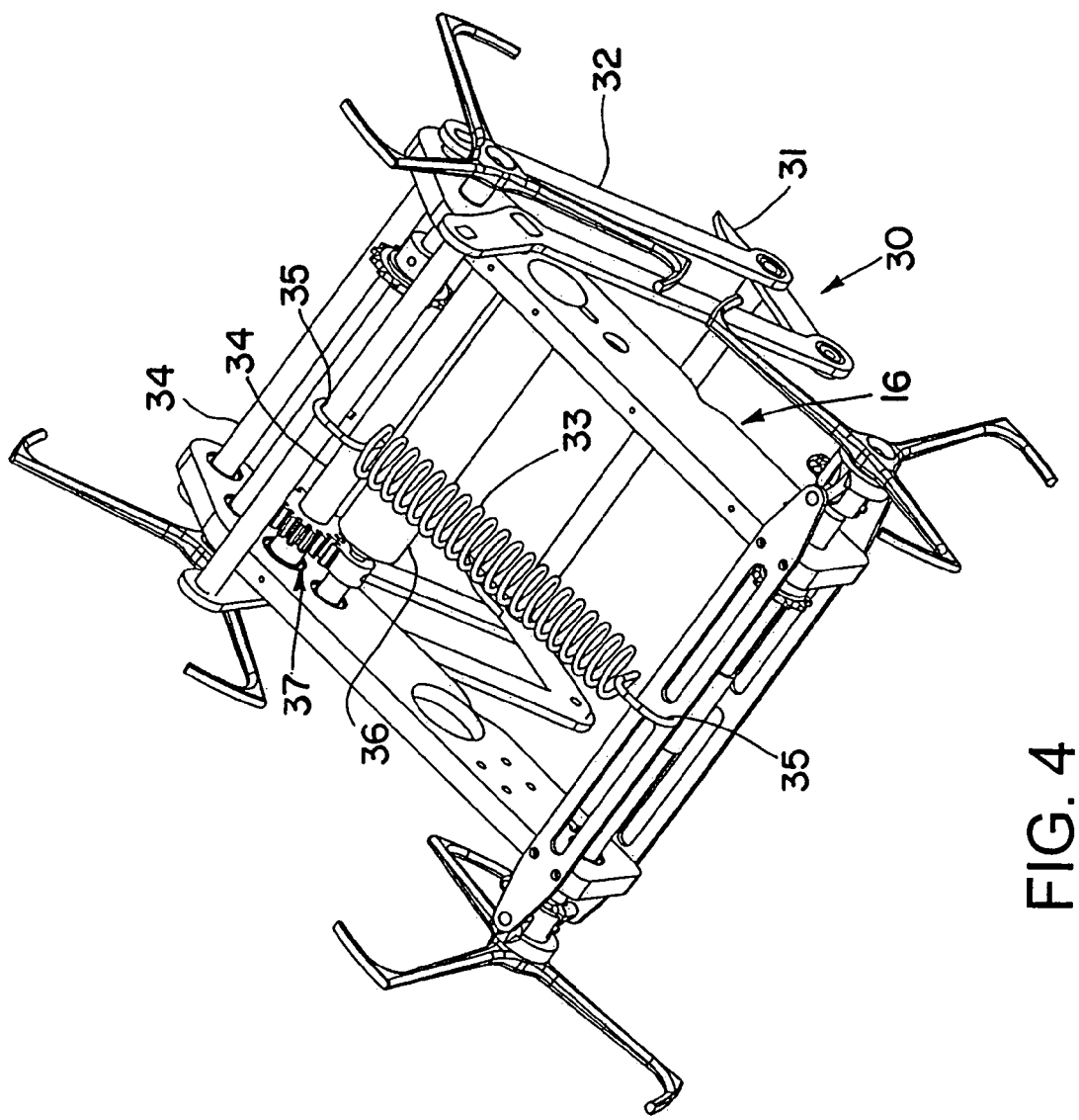
FIG. 4 is a schematic isometric view of a robot as in FIG. 1 but some details have been omitted to show a parallel four-bar jumping mechanism.

The robot A embodiment shown in FIGS. 1 and 4 combines two modalities of running mobility with the secondary mode of locomotion, jumping. The robot A may to operate with a much higher obstacle clearing capability when needed by integrating a jumping mechanism, compared to that of a similar size robot without jumping capability.

Figure 7:
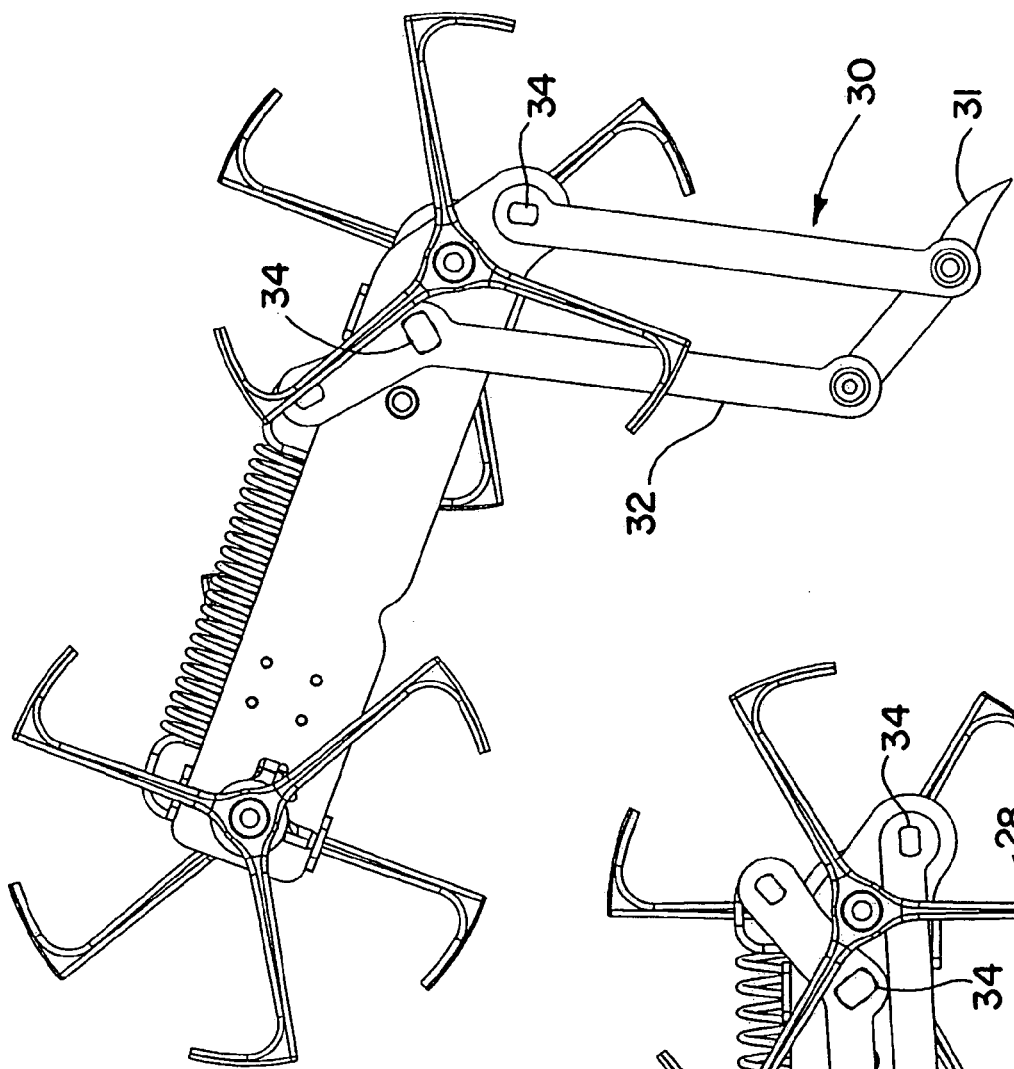
FIGS. 6 and 7 are side elevation views of the robot of FIGS. 1 and 4 respectively illustrating the jumping mechanism in a compact or preparatory position and in a released or jumped position.

In greater detail, FIG. 4 illustrates the components of the robot A's jumping mechanism 30 with several components of the steering system and drive train removed for clarity. The jumping mechanism 30 has two main components, a parallel four-bar linkage 32 and a spring 33. The parallel four-bar linkage 32 is movably mounted to the chassis 16 at or by attachment axles 34, about which the four-bar linkage 32 can rotate as shown in FIGS. 6 and 7 in its compressed and released positions. The parallel four-bar linkage 32 is also connected to the chassis 16 via spring 33 at attachment points 35.

The jumping mechanism 30 operates by causing the spring 33 to store energy in tension and then rapidly releasing the energy by causing the parallel four-bar linkage 32 to release. Upon release, the parallel four-bar linkage 32 thrusts its spiked lower bar 31 downward and rearward thereby imparting an upward and forward jumping motion to the robot chassis 16.

The spring 33 is placed in tension by rotating one of the attachment axles 34 of the parallel four-bar linkage 32 to separate the spring attachment points 35. In the embodiment of FIGS. 1, 4, 6, and 7, this movement or rotation is provided by jump motor 36 through slip gear mechanism 37 (described below). In other embodiments of the invention, the movement or rotation can be provided by the drive motor 21 or other means, without the need for a separate jump motor 36. After the slip-gear mechanism 37 rotates the parallel four-bar linkage 32 to the intended spring 33 extension, the slip-gear mechanism 37 operates as a release mechanism to cause jumping by releasing the energy stored in the spring 33; and this actuates the jumping function. Energy in the spring 33 is released relatively quickly to cause relatively fast rotating of the linkage 32 to cause a jumping action. Gradual release may lead to a pivoting action rather than jumping.

One method of jump actuation shown in FIGS. 1 and 4 uses two independently controlled motors 21, 36 instead of one motor with a secondary gear reduction. This method allows the motor for each mode of locomotion to be individually selected based on independent performance characteristics. A jump motor may also use the "slip-gear" method to actuate the jump mechanism. The removal of the secondary transmission tied to the drive system reduces the associated friction losses from the transmission and additional sprockets, chain and bearings. The system also has the additional advantage of a much reduced spring winding time, due to a lower gear reduction coupled to a specifically chosen jump motor.

In an alternative robot embodiment steering and control may be unnecessary; those components are left out and a solid front axle may be used. The polymer sides of the robot A are similar in design and function, and they support the additional components of the jumping mechanism. These components include a secondary 275:1 transmission, and a parallel four-bar jumping mechanism attached to the frame via two axles. In this alternative embodiment, the driving appendages are driven via the same drive motor and transmission combination. Two sets of chains and sprockets drive the front and rear axles. However, a third chain from the same drive motor and transmission runs an input shaft for an additional Maxon 275:1 planetary transmission, for example, or other transmission, which outputs a slow, high torque motion to wind the jump spring 33. The total gear reduction for the jumping mechanism is 18,545:1.

Slip-Gear Jump Actuation

Figure 5:
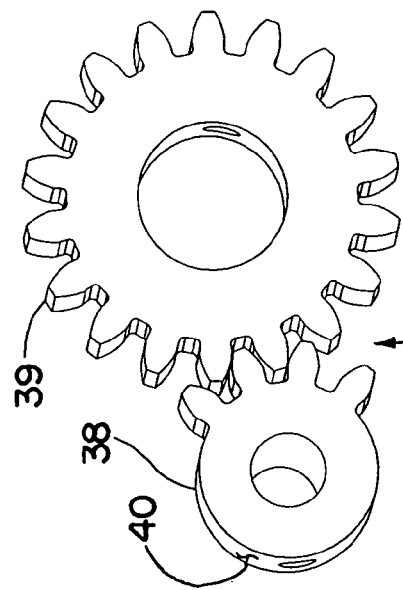
FIG. 5 is a schematic illustration of a slip-gear mechanism.

FIGS. 4 and 5 illustrates components of the slip-gear mechanism 37. A 14-tooth gear with several teeth removed, the "slip-gear" 38, is mounted on the output shaft of the jump motor or of the planetary transmission mentioned above, etc. The slip-gear 38 interfaces with an unmodified 14-tooth gear 39 that is attached to one of the rotating crossbars 34 in the parallel four-bar linkage 32. Running the jump motor 36 (or a linkage from the drive motor 21) turns the slip-gear 38, thereby rotating the four-bar linkage 32 and storing energy in the spring 33. The slip-gear 38 is calibrated so that the teeth will remain in contact with the jump mechanism gear 39 just long enough to wind the jump mechanism 30 to its closed (loaded) position. The slip-gear 38 continues to rotate and reaches the gap 40 where the teeth have been removed; at which point it can no longer wind the jump mechanism gear 39 attached to the parallel four-bar linkage 32. Since the motion of the jumping mechanism is now unconstrained, the large spring 33 force causes it to suddenly release to its open (unloaded) position. The slip-gear 38 can then re-engage and restart the winding process.

Operation of the Several Exemplary Embodiments

An advantage of robot A over wheels is increased mobility on uneven terrains. Because of the three-spoked geometry, a driving appendage robot can climb over obstacles at least 1.5 times as tall as the radius of the driving appendages. An obstacle less than one radius high may stop the same robot fitted with wheels of the same size instead of driving appendages. For example, robot A can easily traverse two 3.8 cm high by 8.9 cm wide obstacles while running at 3 body lengths per second.

In addition to being maneuverable and capable of surmounting large obstacles, as noted above, the small robots, e.g. about 9 cm long, are fast, running at over 10 body lengths per second (90 cm/s). With wheels substituted for driving appendages, speeds up to 50 percent faster have been attained. The reduced speed of driving appendages locomotion is a worthwhile tradeoff for the increase in mobility. Robots A excel in rough terrain such as dirt or grass, where speeds are nearly as high as those on smooth terrain are observed.

The turning radius using driving appendages depends upon the orientation of the driving appendages at the beginning of the turn, but can be as tight as 2.0 body lengths or as large as 3.1 body lengths. The turning radius of the robot A when using wheels is consistently 2.5 body lengths, equal to the average turning radius using driving appendages.

Because of the low profile of the robot frame, robot A can also operate while upside down, if necessary. It is possible for the robot to become inverted when climbing a very large obstacle due to its high power and traction, or it could potentially land upside down after a fall. In order to return the robot to normal upright operation, the operator can drive the vehicle into a large obstacle, so that it flips again.

Tests demonstrate that robot A can leap 22 cm (2.5 body lengths) high, which is greater than the height of one standard stair. The automatically resetting mechanism for repeated jumping works consistently and reliably once set or calibrated. One embodiment uses a relatively soft spring with significant preload in order to store and release the maximum possible energy for the jump, given a certain maximum available motor torque.

Relative to body length, robot A is faster than other comparably sized legged robots. Their design allows each leg to swing higher than the body so greater obstacles can be surmounted. In an embodiment the robot A may be power autonomous and may provide fully wireless operation.

Systems for autonomous operation using principals known in the art form alternative embodiments of the invention. Robot A may be relative strong and robust as to carry more than twice their own body weights in payload.

The uses of a small, yet capable, mobile robot are numerous. Robots A may be used in insect inspired navigation, for which mainly small, wheeled robots are currently used. A more mobile small robot platform could be useful. Robots A have already been successfully used as outdoor sensor platforms. However, in some cases a small robot is necessary to fully investigate certain biological phenomena, e.g. cricket phonotaxis. Robots A provide viable and highly adaptable platforms for outdoor locomotion.

It should be appreciated that numerous modifications and adaptations may be made in accordance with the present invention. Other modifications and adaptations will be apparent to those skilled in the art.

What is claimed is:

1. A vehicle, comprising:
   a chassis;
   front and rear axles, each axle having two multi-spoke driving appendages;
   the multi-spoke driving appendages attached to the chassis to permit rotation of the driving appendages to propel the chassis;
   a mechanical power source;
   a drive train linking the mechanical power source to the multi-spoke driving appendages; and
   wherein the front axle and the rear axle are connected to the mechanical power source to maintain a phase offset between the front and rear axles to achieve a nominal alternating diagonal gait.

2. The vehicle of claim 1, wherein the mechanical power source is a single drive motor capable of driving each of the driving appendages.

3. The vehicle of claim 1, further comprising a jumping mechanism.

4. The vehicle of claim 3, wherein the mechanical rower source includes a single drive motor connected to the front axle and the rear axle by two sets of chains and sprockets; and is further connected via a third chain to a jump transmission that outputs a slow, high torque motion to preload the jumping mechanism.

5. The vehicle of claim 3, wherein the jumping mechanism is spring-activated.

6. The vehicle of claim 3, wherein the jumping mechanism is self-resetting.

7. The vehicle of claim 3, wherein the jumping mechanism comprises a four-bar linkage.

8. The vehicle of claim 7, wherein the jumping mechanism further comprises a sharp tipped foot.

9. The vehicle of claim 3, wherein the jumping mechanism comprises a spring.

10. The vehicle of claim 9, wherein the spring is preloaded.

11. The vehicle of claim 3, wherein the jumping mechanism further comprises a quick-release mechanism.

12. The vehicle of claim 11, wherein the quick-release mechanism includes a slip-gear mechanism adapted such that after jumping, the slip-gear reengages a driven gear and repeats the jumping process.

13. The vehicle of claim 11, wherein the jumping mechanism is adapted such that a jumping actuation and control is independent of a drive actuation.

14. The vehicle of claim 3, wherein the jumping mechanism comprises:
   a secondary transmission; and
   a four-bar linkage;
   wherein the four-bar linkage is attached to the chassis via two pivoting axles.

15. The vehicle of claim 14, wherein the jumping mechanism further comprises a spiked lower bar to propel the chassis forward and upward.

16. The vehicle of claim 14, wherein the jumping mechanism folds into a compact position between jumps.

17. The vehicle of claim 3, wherein the jumping mechanism further comprises a slip-gear mechanism wherein the slip-gear mechanism is adapted such that:
   a gear with a portion with several teeth removed or 'slip-gear' is driven by a motor with or without a transmission;
   the slip-gear engages an unmodified gear that is attached to one of a plurality of rotating cross bars in a four-bar linkage of the jumping mechanism;
   the motor turns the slip-gear thereby rotating the four bar linkage and storing energy in a spring;
   the slip-gear rotates to reach the portion with several teeth removed so that the slip-gear no longer engages the unmodified gear attached to the four-bar linkage; and
   with the motion of the four-bar linkage no longer constrained, the spring releases the stored energy and causes the four-bar linkage to return to an open position.

18. The vehicle of claim 3, wherein the jumping mechanism is adapted such that a jumping actuation and control is independent of a drive actuation.

19. The vehicle of claim 3, wherein the jumping mechanism comprises a separate jump motor.

20. The vehicle of claim 1, further comprising an onboard radio control system.

21. The vehicle of claim 1, wherein the multi-spoke driving appendages are 3 spoke wheel-like legs.

22. The vehicle of claim 21, wherein the multi-spoke driving appendages further include a foot comprising an arc segment that generally follows a circumference of the driving appendage.

23. The vehicle of claim 22, wherein a length of the foot is selected to provide a compromise of a smooth ride verses climbing performance.

24. The vehicle of claim 22, wherein the foot length comprises an arc segment between 10 and 40 degrees.

25. The vehicle of claim 21, wherein the spokes on at least one of the 3 spoke driving appendages are splayed outward.

26. The vehicle of claim 1, wherein the multi-spoke driving appendages have spokes that are made from a flexible material to provide compliance.

27. The vehicle of claim 1, wherein the spokes are driven by the axles through a flexible coupling system to provide compliance.

28. The vehicle of claim 1, wherein flexible materials are used in the multi-spoke driving appendages and/or the axle components provide torsional compliance for automatic gait adaptation.

29. The vehicle of claim 1, wherein the front axle and the rear axle are connected to one drive motor via non-slipping drive train to maintain the phase offset between the front and rear axles to achieve a nominal alternating diagonal gait.

30. The vehicle of claim 1, further including a steering system.

31. The vehicle of claim 30, wherein the drive train includes a torsionally compliant device.

32. The vehicle of claim 31, wherein the torsionally compliant device includes a spring.

33. The vehicle of claim 32, wherein the spring has a preload.

34. The vehicle of claim 30, wherein said multi-spoke driving appendages have at least three compliant spokes.

35. A vehicle comprising:
a chassis;
a motor secured to the chassis; and
a drive system secured to the chassis and connected to the motor;
a plurality of multi-spoke driving appendages; and
a compliant device to allow adaptive gait changes between individual driving appendages wherein the multi-spoke driving appendages passively change phase out of an alternating diagonal gait to adapt to uneven terrain and return to an alternating diagonal gait on even terrain.

36. The vehicle of claim 35 further comprising, a jumping mechanism.

37. The vehicle of claim 36, wherein the drive system comprises:
a drive member that provides a source of rotational power/torque;
a pair of pretensioned torsionally compliant devices, each coupled to receive rotational power/torque via the drive member; and
a pair of the multi-spoke driving appendages, each coupled to a respective one of the torsionally compliant devices to rotate in response to the rotational power/torque provided by the respective torsionally compliant device;
wherein the torsionally compliant devices allow a phase angle change between the pair of driving appendages in response to a force or torque applied to at least one of the driving appendages.

38. The vehicle of claim 35, wherein the multi-spoke driving appendages are compliant.

39. The vehicle of claim 35, comprising front and rear axles wherein the front and rear axles are phased to employ a diagonal gait.

40. The vehicle of claim 39, wherein the diagonal gait is such that when a spoke of one driving appendage contacts the terrain, a spoke of the driving appendage located on the opposite axle and on the opposite side of the vehicle contacts the terrain in generally the same manner.

41. A robot adapted to run and jump, comprising:
a robot chassis designed to accept the mounting of any of:
a drive train, a steering system, a power supply, and/or an onboard radio control system;
two axles movably mounted to the chassis, each axle having two (three-spoke appendages); and
a drive motor and transmission attached to the chassis to drive the two three-spoke appendages on each axle and to simultaneously power a jumping mechanism.

42. The robot of claim 41, wherein:
each of the three-spoke appendages are driven by the drive motor via two sets of chains and sprockets connected to the two axles; and
a third chain is connected to a transmission that outputs a slow, high torque motion to wind a spring-activated jumping mechanism.

43. The robot of claim 42 wherein:
each three-spoke appendage has a foot that consists of an arc segment that follows a circumference of the appendage.

* * * * *